| | | | |
|---|---|---|---|
| | | US005400991A | |
| United States Patent [19] | | [11] Patent Number: | 5,400,991 |
| Werner | | [45] Date of Patent: | Mar. 28, 1995 |

[54] MODULAR MOUNTING ASSEMBLY

[75] Inventor: Jack E. Werner, Ann Arbor, Mich.

[73] Assignee: Minnesota Mining and Manufacturing Company, St. Paul, Minn.

[21] Appl. No.: 978,869

[22] Filed: Nov. 19, 1992

[51] Int. Cl.$^6$ ............................................. A47B 96/06
[52] U.S. Cl. .................................... 248/230; 248/125; 248/222.1; 248/282
[58] Field of Search ............... 248/223.4, 223.3, 222.1, 248/637, 639, 674, 681, 122, 125, 178, 186, 187, 218.4, 219.4, 231.6, 230, 282, 283, 287, 316.8; 211/188, 194, 98

[56] References Cited

U.S. PATENT DOCUMENTS

| | | | |
|---|---|---|---|
| 941,591 | 11/1909 | Sweet | 248/282 |
| 1,224,617 | 5/1917 | Easton | 248/282 |
| 1,318,703 | 10/1917 | Stuchlak | 248/282 X |
| 1,403,863 | 1/1922 | Peat | 248/222.1 |
| 3,031,086 | 4/1962 | Blair | 248/122 |
| 3,386,695 | 6/1968 | Blood et al. | 248/222.1 |
| 3,822,049 | 7/1974 | Saunders | 248/674 X |
| 3,910,538 | 10/1975 | Baitella | 248/122 |
| 4,993,683 | 2/1991 | Kreuzer | 248/639 |
| 5,078,270 | 9/1992 | Campbell | 211/194 X |
| 5,142,734 | 9/1992 | Looman et al. | 248/180 X |

FOREIGN PATENT DOCUMENTS

| | | | |
|---|---|---|---|
| 92073 | of 1938 | Germany | 248/283 |
| 3302 | of 1896 | United Kingdom | 248/282 |

OTHER PUBLICATIONS

A brochure entitled "Quality and Reliability in a Modular System" by Sarns 3M Health Care, 1990 (2 pages).
A brochure entitled "9000 Perfusion System", by Sarns 3M Health Care, 1991 (4 pages).
A brochure entitled "Sarns Auxiliary Cardiovascular Equipment", by Sarns 3M Health Care, 1989 (9 pages).
A document entitled "Photo Gallery: Perfusion History", Perfusion Life, May 1992, (1 page).
A document entitled "The BCD Advanced Proof We Have Designs On Staying The Leader", by Sorin Biomedical (1 page).
An article entitled "New Monitoring System" by Cardio Metrics and photograph from News Clips, (1 page).
A brochure entitled "Centrifugal Pump System" by Sarns 3M Health Care, 1989, (1 page).
A brochure entitled "Cardioplegia Sets Bracket and Mounting Hardware" by Sarns 3M Health Care, 1990, (1 page).
An article entitled "The Finishing Touches in Perfusion System Management", by COBE Laboratories Inc., 1988, (4 pages).
A brochure entitled "The MX2 Oxygen Saturation and Hematocrit System", by Medtronic Europe, 1992, (1 page).
A brochure entitled "Computer Aided Perfusion System (CAPS)", by Stockert-Shiley, (12 pages).
A brochure entitled "Sarns Infant Membrane Oxygenator", by Sarns 3M Health Care, 1990 (2 pages).
A brochure entitled "Plain and Simple", by Sarns 3M Health Care, 1991 (2 pages).
A brochure entitled "MDX Modular Heart-Lung System", by Sarns 3M Health Care, 1990, (1 page).
A page from "News & Analysis" which describes a product by DecTron (1 page).

Primary Examiner—Alvin C. Chin-Shue
Assistant Examiner—Korie H. Chan
Attorney, Agent, or Firm—Gary L. Griswold; Walter N. Kirn; Jeffrey J. Hohenshell

[57] ABSTRACT

A mounting assembly for use in a medical environment is described. The mounting assembly comprises pivotally mounted proximal and distal arms. The distal arm is adapted to receive modules of medical equipment.

17 Claims, 4 Drawing Sheets

MODULAR MOUNTING ASSEMBLY

TECHNICAL FIELD

The present invention relates generally to mounting assemblies for use in a medical environment.

BACKGROUND OF THE INVENTION

Modern operating rooms are filled with complicated, expensive equipment used during medical procedures. Operating rooms have special needs such as temperature and filtering controls. As a result, costs associated with operating room space are generally high.

It is desirable to efficiently use the available space in the operating room in order to reduce healthcare costs. At the same time, the operating room equipment should be efficiently arranged to afford convenient use by the medical personnel (e.g. a perfusionist, nurse or surgeon).

The art is replete with mounting equipment used in a hospital operating room environment. One example of mounting equipment is the assembly used to mount perfusion equipment that is used during cardiovascular surgery. The equipment comprises a base assembly including a cart having a base with a plurality of wheels, vertically extending mounting "masts" or poles, and a horizontally extending pole situated generally at the top of the equipment and extending between the vertical poles. Such equipment include the Computer Aided Perfusion System (CAPS) generally available from Stockert Shiley TM (a Pfizer Co.) of Irvine, Calif., the Console Base generally available from COBE TM of Lakewood, Colo., and the "SARNS brand 9000" Perfusion System available from the Minnesota Mining and Manufacturing Co. (3M) of St. Paul, Minn.

The art is replete with mounting bracket assemblies that are used in conjunction with the above mentioned base assemblies. Some of those mounting bracket assemblies comprise a collar with a cylindrical hole. The collar is attached to the pole by placing the collar over the top of the pole and sliding the collar down the pole. However, when this type of collar is removed from the pole, any equipment that is attached to the pole and situated above the collar must also be removed. This may be inconvenient for a user, particularly when several pieces of equipment are situated above the collar.

Other mounting bracket assemblies utilize a clamp with a threaded set screw which abuts the pole. Tightening the set screw forces the screw against the pole to hold the bracket assembly to the pole, but also tends to mar the pole.

Some mounting bracket assemblies afford a change of the orientation of the perfusion equipment relative to the clamp which attaches the equipment to the pole. However, some of those assemblies tend to tighten or loosen when the equipment is pivoted relative to the clamp, resulting in equipment which is inconvenient for a user to manipulate.

Additionally, prior art mounting assemblies typically receive medical equipment on one, predetermined surface (e.g. the top or the bottom surface of the bracket). A user is not afforded the flexibility to mount the medical equipment at more than one surface.

DISCLOSURE OF THE INVENTION

The present invention provides a mounting bracket assembly for use with a base assembly having a vertically extending pole or mast. The mounting bracket of the present invention: (1) affords stacking of a plurality of medical equipment modules (e.g. one on top of the other) in a variety of orientations to efficiently use available space (e.g. such as space in an operating room), (2) mounts the medical equipment modules on a distal arm which is pivotally attached to a proximal arm so that the modules may be pivotally repositioned without loosening the attachment between the equipment and the mounting bracket assembly, (3) affords pivoting movement of the distal arm relative to the proximal arm while resisting tightening and loosening of the distal arm relative to the proximal arm, (4) affords convenient mounting and removal of the mounting bracket to and from the vertically extending pole and the modules of equipment to and from the distal arm without interfering with other equipment which may be connected to the pole, (5) restricts damage to the pole from the bracket itself, (6) releasably affixes a module of medical equipment to the distal arm, and (7) affords convenient disassembly.

The mounting bracket assembly comprises a proximal arm and a distal module mount arm. A pivot mounts the distal module mount arm for pivotal movement relative to the proximal arm. Preferably, the pivot does not tighten or loosen when the distal arm is pivoted relative to proximal arm. The distal module mount arm has first and second major surfaces (e.g. top and bottom surfaces). The bracket assembly also has mounting plates for receiving a module of medical equipment on at least one of the first or second major surfaces of the distal module mount arm.

The bracket assembly further includes a clamp for releasably attaching the proximal arm to the pole. The clamp includes fixed and movable jaws having fixed and movable engagement surfaces. The engagement surfaces are complementary to the outer surfaces of the pole.

The fixed jaw includes a groove, and the movable jaw includes a rib that is adapted to be received in the groove of the fixed jaw. The movable jaw pivots in the groove relative to the fixed jaw to allow the jaws to be brought together by a handle/screw assembly. The screw in the handle/screw assembly is adapted to be received in a threaded bore on the fixed jaw.

BRIEF DESCRIPTION OF THE DRAWING

The present invention will be further described with reference to the accompanying drawing wherein like reference numerals refer to like parts in the several views, and wherein.

DETAILED DESCRIPTION

Figure 1:
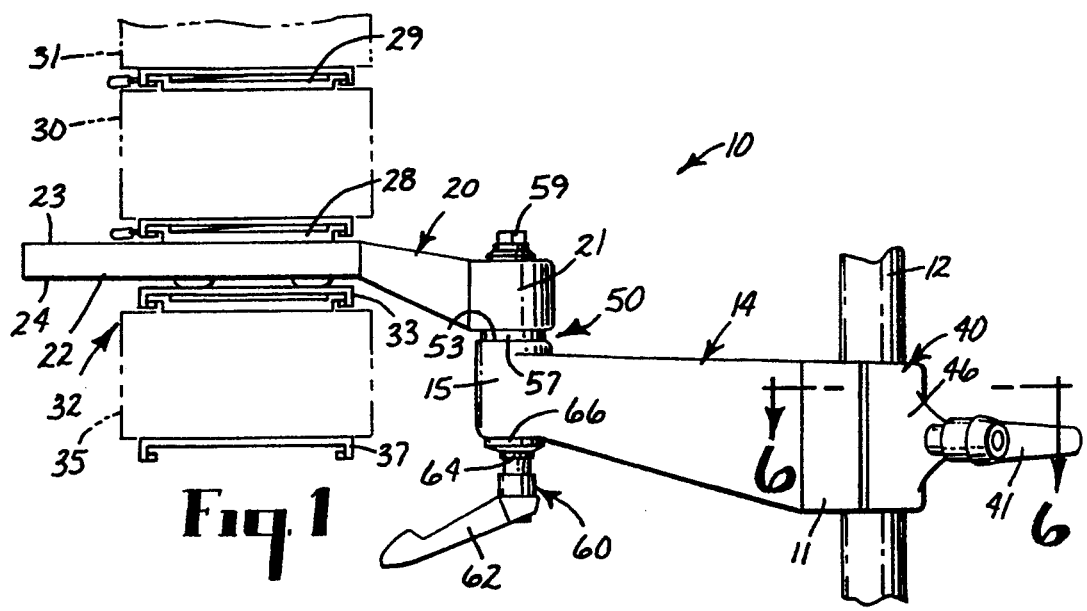
FIG. 1 is an elevation view of a mounting bracket assembly according to the present invention which illustrates modules of medical equipment in broken lines.
Figure 2:
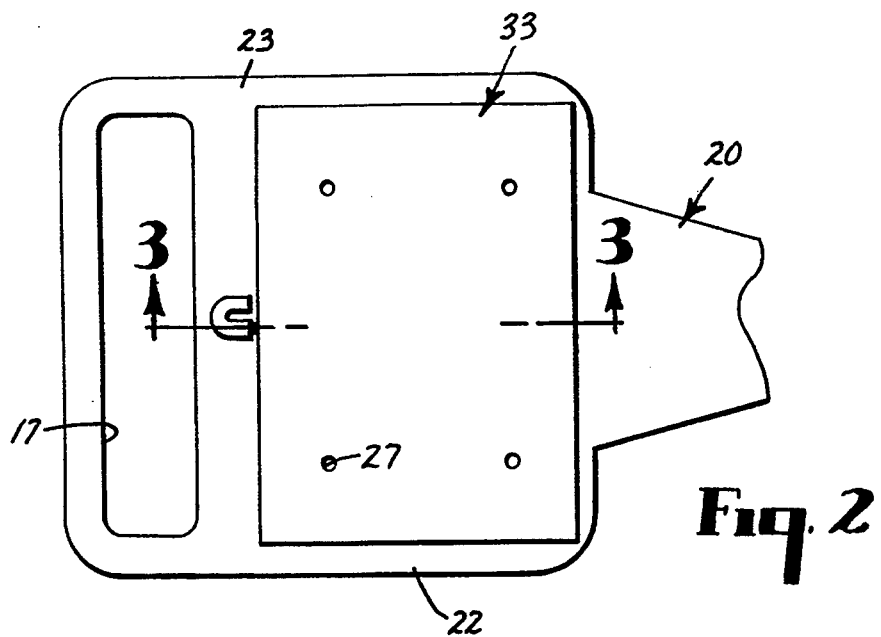
FIG. 2 is a top view of a portion of a distal module mount arm having portions broken away and having the modules of medical equipment removed to illustrate details.

Referring now to FIGS. 1 through 7 of the drawing, there is shown a mounting bracket assembly according to the present invention generally designated by the reference number 10. The mounting assembly 10 may be used with a base assembly 2 (see FIG. 7).

For example, the base assembly 2 may comprise the "MD-4" Pump Base of the "MDX" Modular Heart Lung System, available from Minnesota Mining and Manufacturing Co. (3M) of St. Paul, Minn. That base assembly 2 includes a cart portion 3 having top 4 and bottom 5 surfaces with a plurality of wheels 6 attached to the bottom surface 5. Healthcare or medical equipment such as the blood pumps available under the trade designations "SARNS 7000" or "Delphin II" or supplemental power units may be placed on the top surface 4 of the base assembly 2.

The base assembly also comprises a generally vertically projecting pole 12 having any suitable cross-sectional shape, such as cylindrical, hexagonal, triangular or any polygonal shape comprised of straight or arcuate lines or combinations thereof, but typically cylindrical.

While the base assembly described above is used with perfusion equipment, it should be noted that the mounting bracket assembly 10 of the present invention may be used with any suitable medical equipment that may be attached to a pole or mast 12.

The mounting bracket assembly 10 comprises a proximal arm 14 having first 11 and second 15 end portions, and a distal module mount arm 20 having first 21 and second 22 end portions and upper 23 and lower 24 surfaces. Optionally, the second end portion 22 of the distal module mount arm 20 may comprise surfaces 17 extending between the upper and lower surfaces 23 and 24 which form a hole (FIG. 2) which opens onto the upper and lower surfaces. The surfaces defining the hole 17 may be grasped by a user's hand and used as a handle to manipulate the relative positions of the distal 20 and proximal 14 arms.

The hole 17 may function as a reservoir to encompass tubes or cables from the operating room equipment that might otherwise stray into a user's way. Also optionally, an appropriately shaped tray (not shown) may be placed in the hole 17.

The proximal and distal arms 14 and 20 are preferably constructed from cast or machined aluminum, but may be constructed from any suitable material, including, but not limited to a cast iron or steel or even a polymeric material. The mounting bracket assembly 10 includes an upper module mount assembly comprising at least one upper mounting plate 28 attached to the upper surface of the distal module mount arm. The mounting plate 28 may be attached to the mount arm 20 by four screws 27 which are threaded into threaded bores opening to the top surface of the mounting arm 20.

The upper mounting plate 28 slidably receives a first, upper module of healthcare or medical equipment 30.

As used herein, the phrase "module of healthcare equipment" or "module of medical equipment" means any suitable unit of equipment which may be used in a medical environment such as in operating rooms, X-ray or other diagnostic rooms, intensive care units, dental examination and surgery rooms, critical care units, labor/delivery rooms or any examination rooms. Specific examples of equipment 30 include but are not limited to, air and blood level sensors, time keeping modules, temperature monitors, flow monitors, blood gas or chemistry modules, or display modules. Each module need not have an identical shape.

The upper mounting plate 28 preferably comprises a pair of mounting flanges 72 extending generally parallel to each other along opposite edges of the upper mounting plate 28. The flanges 72 are slidably received in a pair of opposed mounting channels 73 extending along opposite edges of the first, upper module of healthcare equipment 30. The opposed mounting channels 73 define a track for receiving the flanges 72. Preferably, the ends of the flanges 72 include a forty-five (45) degree bevel to allow the flanges 72 to be easily slid into channels 73.

The upper mounting plate 28 also preferably includes a detent slit 74 that is adapted to receive a detent spring 75 from the first, upper module of medical equipment 30. Preferably a plurality (e.g. four) of O-rings 76 are situated between the upper mounting plate 28 and the top surface 24 of the distal module mount arm 20. The O-rings 76 act as vibration dampeners to prevent rattle between the flanges 72 and the channels 73. Preferably, the channels 73 and flanges 72 are constructed from a metal material. The O-rings also restrict metal to metal binding between these elements.

The detent spring 75 is movable between (1) a release position (illustrated in phantom in FIG. 3) which affords slidable movement of the first upper module of medical equipment 30 onto the upper mounting plate 28 and (2) an engage position (FIG. 3, solid lines) wherein the detent spring 75 engages the detent slit 74 on the mounting plate 28 to restrict relative movement between the mounting plate 28 and the first, upper module of medical equipment 30. The detent spring 75 is inherently biased toward the engage position such that a tactile or audible signal may be sensed when the detent spring 75 engages the detent slit 74 on the upper module of medical equipment 30.

Both the detent spring 75 and the O-rings 76 restrict relative movement between a module of medical equipment and a mounting plate. The O-rings provide a snug fit between the flanges 72 and channels 73. When the detent spring 75 engages detent slit 74, the detent spring 75 acts as a barrier to relative slidable movement between the mounting plate 28 and its equipment 30.

Optionally, the upper module mount assembly may comprise a second upper mounting plate 29 attached to a top surface of the first, upper module of medical equipment 30. The second upper mounting plate 29 slidably receives a second upper module of medical equipment 31. As shown in dashed lines in FIG. 1, the medical equipment 30, 31 may be "stacked", one on top of another to afford convenient use of the available operating room space, and to avoid the attendant expense of additional module mounting assemblies that would otherwise be required for the module 31.

The mounting bracket assembly 10 also includes a lower module mount assembly 32 comprising at least one lower mounting plate 33 attached to the lower surface 24 of the distal module mount arm 20. The mounting plate 33 may be attached to lower surface 24 by four screws which are threaded into threaded bores opening to the lower surface of the mounting arm 20.

The lower mounting plate 33 may also include detent means for restricting relative movement between the first, lower module of medical equipment 35 and the mounting plate 33. That means may comprise the detent spring 82 similar to the detent spring 75 described above.

Figure 3:
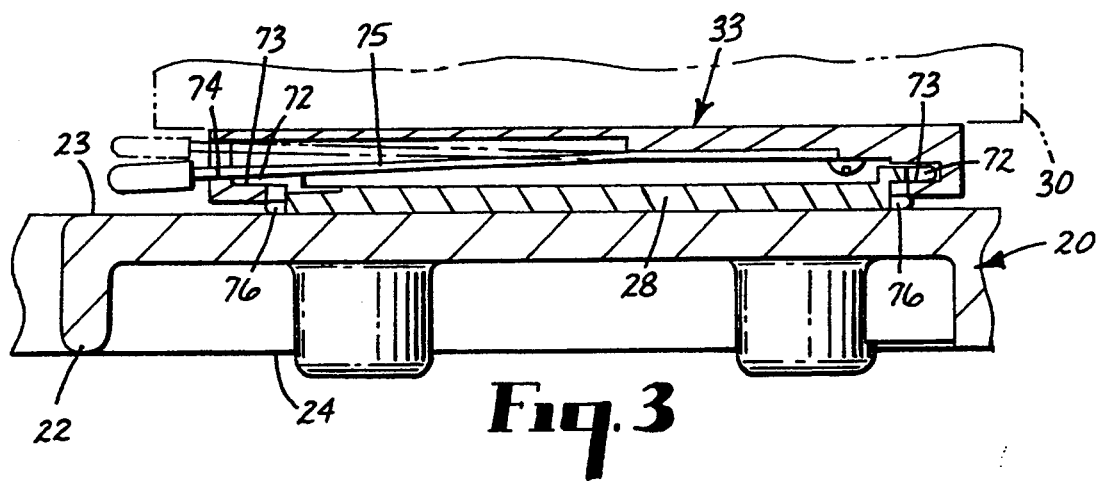
FIG. 3 is a sectional view through the distal module mount arm of FIG. 2 taken approximately along lines 3—3 of FIG. 2 which illustrates an upper mounting plate engaged with a mounting plate on a first upper module of medical equipment shown in broken lines, and with the bottom module of equipment and mounting plates omitted.
Figure 4:
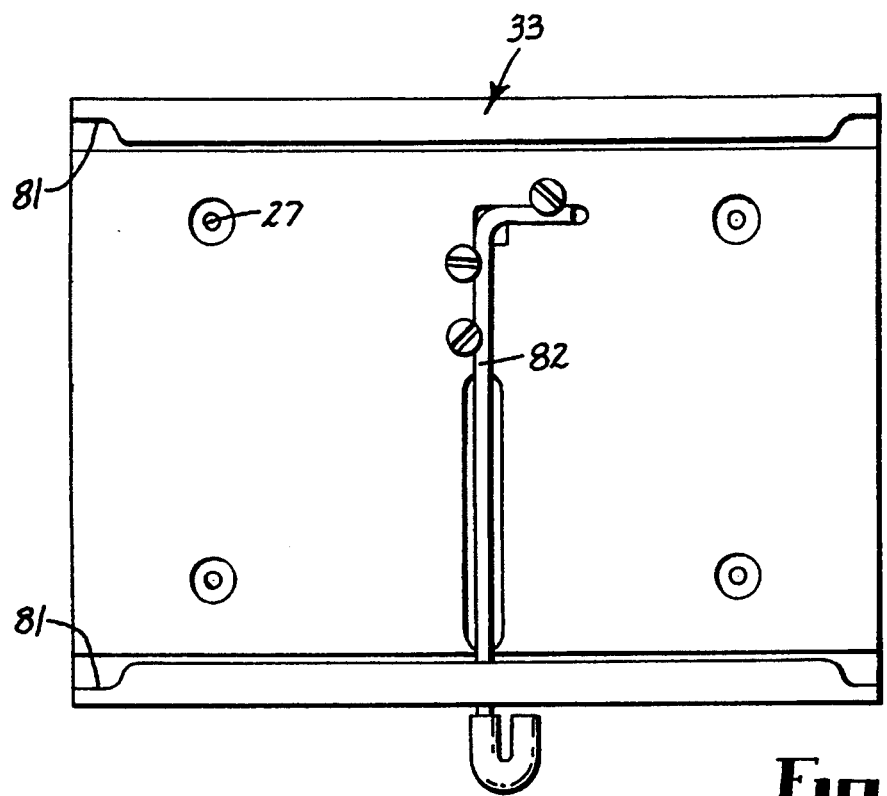
FIG. 4 is a bottom view of a lower mounting plate which is attached to the lower surface of the distal module mount arm with a lower module of medical equipment omitted to show details.

Referring now to FIG. 4, preferably, the lower mounting plate 33 comprises a pair of opposed mounting channels 81 (similar to channels 73, see FIG. 3) extending along opposite edges of the lower mounting plate and defining a track for receiving mounting flanges on the first, lower module of medical equipment 35.

The lower mounting plate 33 slidably receives a first, lower module of medical equipment 35. Like the upper module mount assembly, the lower module may optionally comprise a second lower mounting plate 37 (generally identical to the plate 33) attached to a bottom surface of the first, lower module of medical equipment 35. The second lower mounting plate 37 slidably receives a second lower module of medical equipment (not shown). Thus, the medical equipment (e.g. 35) may be "stacked", one below another to afford convenient use of the available operating room space.

As best shown in FIG. 3, a plate 28 with flanges 72 is complementary to a plate (e.g. 33) with channels 73 which form a track. The plate situated on the top surface 23 of the distal arm 20 should be complementary with a plate situated on the bottom surface 24 of the arm 20. Likewise, the plate on the top of a module of healthcare equipment (e.g. 35) should be complementary with a plate situated on the bottom surface of the module of healthcare equipment. This contributes to maximum flexibility in arranging modules. As shown in the drawings, the plate on the top surface of the modules of healthcare equipment has a flange and the plate on the bottom surface has a channel. It should be noted that this arrangement could be reversed as long as the plate on the top 23 of the arm 20 is reversed with the plate on the bottom 24.

Figure 6:
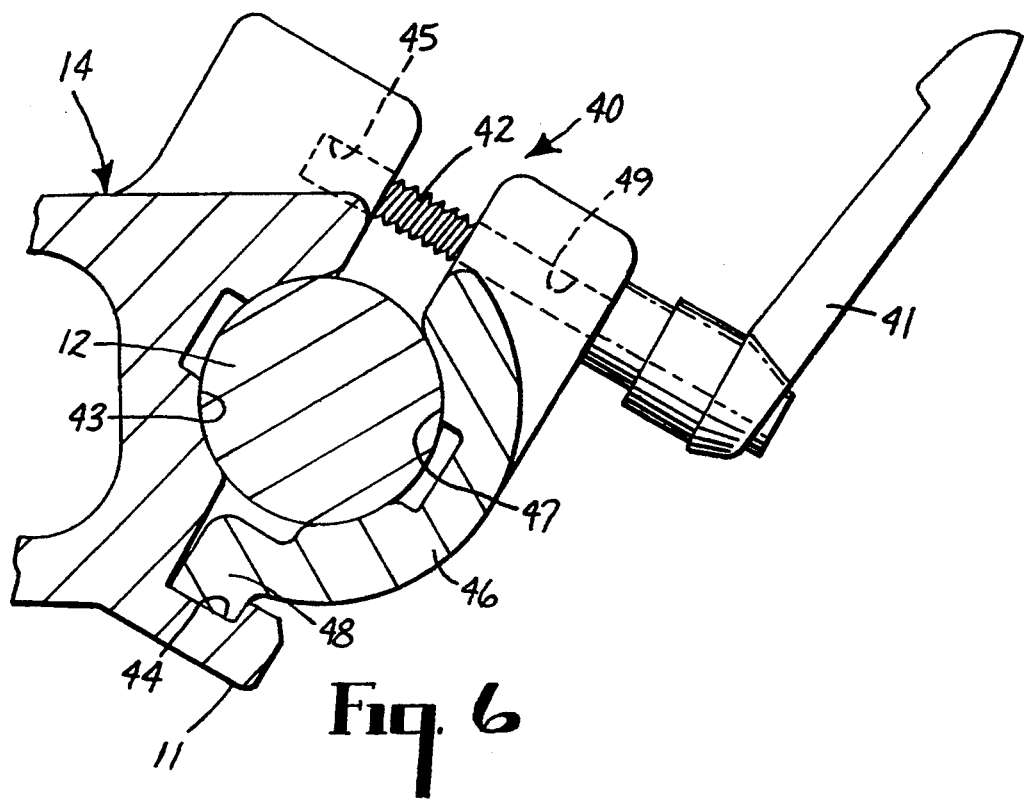
FIG. 6 is an enlarged sectional view taken approximately along lines 6—6 of FIG. 1.

A clamp 40 is present which releasably attaches the first end portion 11 of the proximal arm 14 to the pole 12. As best seen in FIGS. 1 and 6, the clamp 40 comprises a handle 41 having a threaded screw portion 42. The clamp 40 provides a means for attaching the bracket assembly 10 to the pole 12 wherein the pole 12 remains free of contact with the threaded screw portion 42 to restrict damage to the pole 12.

The first end portion 11 of the proximal arm 14 forms a fixed jaw having first engagement surfaces 43 which are generally concave or semi-circular for surface-to-surface engagement with the vertically projecting pole 12, a rib receiving groove 44, and a threaded bore 45 for receiving the threaded screw portion 42 of the handle 41.

The clamp 40 includes a movable jaw 46 having second engagement surfaces 47 which are generally concave or semi-circular for surface-to-surface engagement with the vertically projecting pole 12, a rib 48 that is received in the groove 44 of the proximal arm 14 along one edge of the movable jaw 46, and a bore 49 for affording passage of the threaded screw portion 42 adjacent the opposite edge of the movable jaw 46 with the second engagement surfaces 47 being located between the rib 48 and the bore 49.

As best seen in FIG. 6, the radius of curvature of the first and second engagement surfaces 43, 47 is generally coaxial with the central longitudinal axis of the pole 12 when the clamp 40 is mounted on the pole 12. The engagement surfaces 43, 47 are complementary to the pole 12 and may optionally include a groove extending in the direction parallel to the longitudinal axis of the pole when the clamp 40 is mounted on the pole. Also, the movable jaw 46 may optionally include a cut away portion near rib 48 (see FIG. 6) to restrict binding when the movable jaw 46 pivots in groove 44 relative to the fixed jaw.

The movable jaw 46 pivots in the groove 44 relative to the fixed jaw to allow the jaws to be brought together by the handle 41 and screw 42 assembly to securely clamp the bracket 10 onto the pole 12. After (1) the rib 48 is placed in the groove 44 of the proximal arm 14 and (2) the vertically projecting pole 12 is placed between the first and second engagement surfaces 43 and 47, the threaded screw portion 42 of the handle 41 may then be manually passed through the bore 49 in the movable jaw 46 and threaded into the threaded bore 45 of the proximal arm 14 to frictionally attach the first end portion 11 of the proximal arm 14 to the pole 12.

Alternately, the fixed jaw 14 could be placed against the pole 12 and the movable jaw 46 and screw portion 42 attached to clamp the pole 12 between the fixed and movable jaws 14 and 46.

A pivot mounting means 50 mounts the first end portion 21 of the distal module mount arm 20 to the second end portion 15 of the proximal arm 14 to afford pivotal movement of the distal module mount arm 20 relative to the proximal arm 14. The pivot mounting means 50 affords convenient adjustment of the orientation of the distal arm 20 without the need to adjust that portion of the mounting bracket assembly 10 which directly engages the pole 12 (e.g. clamp 40).

Figure 5:
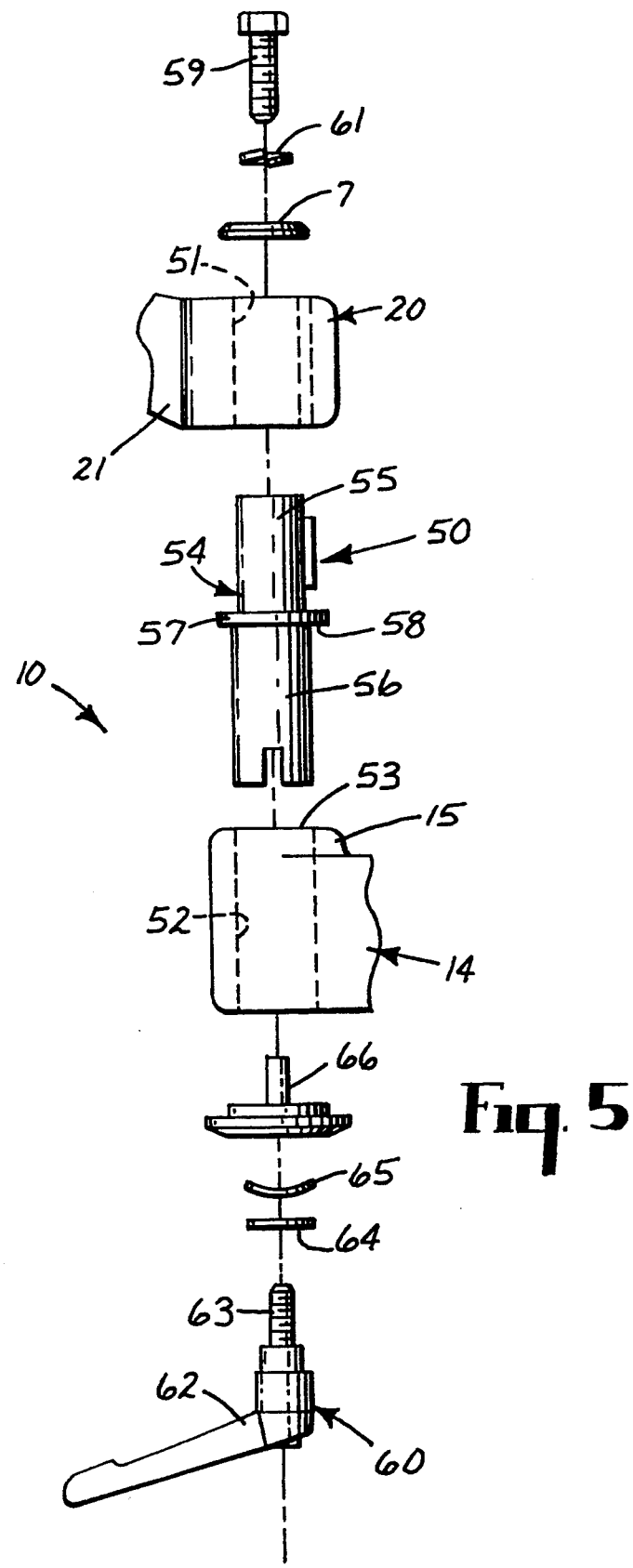
FIG. 5 is an enlarged, exploded view of pivot and securing means of the mounting bracket assembly shown in FIG. 1, with portions broken away to illustrate details.
Figure 7:
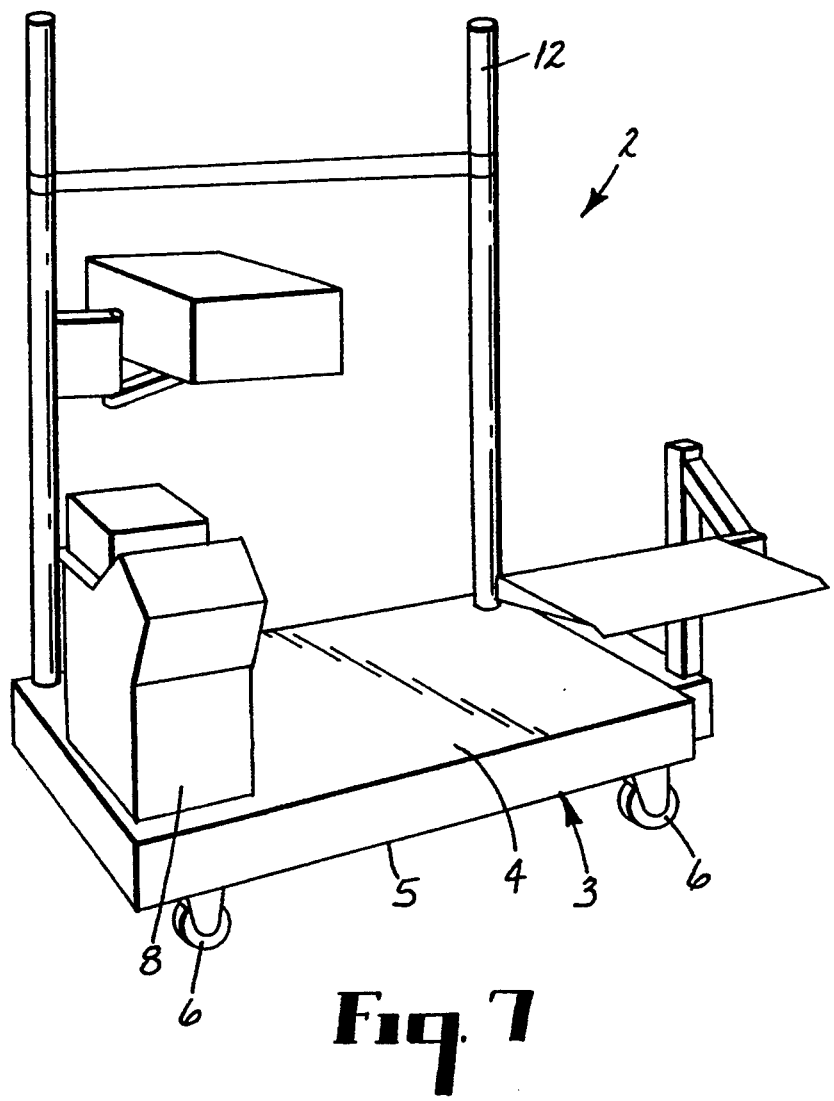
FIG. 7 is a perspective view of a base assembly comprising a cart having a vertically extending pole.

Referring now to FIG. 5, the first end pole portion 21 of the distal module mount arm 20 has a hole 51, and the second end portion 15 of the proximal arm 14 has a hole 52 and abutment surfaces 53.

The pivot mounting means 50 includes a shaft 54 having a top portion 55 received in the hole 51 of the distal module mount arm 20, a bottom portion 56 received in the hole 52 of the proximal arm 14, and a flange 57 situated generally between the top 55 and bottom 56 portions and having bearing surfaces 58 supported by the abutment surfaces 53. The shaft 54 is preferably constructed from stainless steel, and the arms 14 and 20 of cast aluminum.

A means fixedly attaches the top portion 55 of the shaft 54 to the distal module mount arm 20. That means may comprise the top portion 55 of the shaft 54 having a threaded bore (not shown), a threaded screw 59 received in the threaded bore of the top portion 55 of the shaft 54, and at least one washer 7 (and preferably including the lock washer 61 that prevents screw 59 from loosening). A key on the top portion 55 of shaft 54 fits into a keyway in the hole 51 of the distal arm 20 (shown in FIG. 5 as dashed lines) to prevent relative movement between the shaft 54 and distal arm 20.

Optionally the means 50 includes an adhesive such as Loctite RC609 adhesive, generally available from Loctite Corp. of Simsbury, Conn. The adhesive accommodates various tolerances between the parts.

A securing means 60 releasably secures the distal module mount arm 20 in an orientation relative to the proximal arm 14. An inadvertent or accidental bump of operating room equipment (e.g. 30) or the arm 20 is not likely to displace the relative positions of the arms 14 and 20.

The securing means 60 is adjustable to provide frictional resistance to pivoting movement of the distal module mount arm 20 relative to the proximal arm 14. The securing means 60 also comprises means for maintaining a generally constant resistance to pivoting movement of the distal module mount arm 20 relative to the proximal arm 14. That means resists change in the resistance to pivoting movement between the distal and proximal arms as the distal module mount arm 20 is pivoted relative to the proximal arm 14. Thus, the resistance to pivoting of the arms 14 and 20 generally does not increase or decrease when the arm 20 is pivoted relative to arm 14.

The securing means 60 preferably comprises a handle 62 having a threaded portion 63, a washer 64, spring washer 65 and a shaft cap 66. The bottom portion 56 of the shaft 54 has a threaded bore for receiving the threaded portion 63 of the handle 62.

The shaft cap 66 has a key which fits into a keyway in the hole 52 of the bottom portion 56 of the shaft 54 to prevent relative movement between the shaft cap 66, handle 62 and shaft 54 when the arm 20 is pivoted relative to the arm 14. Thus, when the distal arm 20 is moved relative to the arm 14, the shaft 54, cap 66 and the clamp handle 62 move relative to the arm 14. This action resists change in the resistance to pivoting movement between the distal and proximal arms when the distal module mount arm 20 is pivoted relative to the proximal arm 14.

An operator tightens the securing means 60 by turning handle 62 to screw threads 63 into a threaded bore in the bottom portion 56 of the shaft 54. The spring 65 allows the operator to set the "drag" or amount of resistance to pivoting movement of the arms 14 and 20.

Screwing the threaded portion 63 of the handle 62 into the threaded bore of the shaft 54 frictionally clamps the second end portion 15 of the proximal arm 14 between shaft cap 66 and the flange 57 of the shaft 58 to restrict pivotal movement of the proximal arm 14 relative to the distal module mount arm 20. Unscrewing the threaded portion 63 of the handle 62 out of the threaded bore of the shaft 54 affords generally unrestricted relative pivotal motion between the proximal arm 14 and the distal module mount arm 20 to afford free adjustment of the orientation of the distal module mount arm 20 relative to the proximal arm 14.

Upon disassembly, the handle 63 may be removed without compromising the stability (e.g. vertical) of arm 20 relative to arm 14. The user may thus disassemble the bracket assembly 10 in situ with reduced concerns that the medical equipment (e.g. 30) may fall.

OPERATION

The operation of the present invention will now be described with reference to FIGS. 1 through 7 of the drawing.

Initially, the rib 48 of the movable jaw 46 is placed in the groove 44 of the proximal arm 14. A pole 12 is situated between the first and second engagement surfaces 43 and 47. The threaded screw portion 42 of the handle 41 is then threaded into the bore 45 without direct contact between the screw 42 and the pole 12. In this manner, the mounting bracket may be conveniently attached from the side of the pole 12 without affecting medical equipment attached above or below the bracket 10.

Medical equipment (e.g. 30, 31 and 35) may then be attached to the distal arm 20. The bracket 10 affords convenient use of available space as a user may mount equipment above or below the arm 20. The means 50 affords adjustment of the arm 20 relative to the arm 14 so that a user can situate the medical equipment (e.g. 30, 31 or 35) in the desired orientation. Means 60 provides an adjustable frictional relationship between arms 14 and 20 which resists pivoting between the members. This may be provided by tightening the handle 62 to the desired tightness. Once adjusted by the user, the frictional resistance to pivoting between the arm 14 and the arm 20 remains generally constant.

To remove the medical equipment (e.g. 30, 31 or 35), the user may conveniently manipulate lock spring 74 (compare dashed and solid lines in FIG. 3) and slide the equipment from the distal arm 20. The mounting bracket 10 may then be easily removed from the pole 12 by loosening handle 41. Thus, equipment situated above the bracket 10 need not be removed to remove the bracket 10.

The present invention has now been described with reference to several embodiments thereof. It will be apparent to those skilled in the art that many changes can be made in the embodiment described without departing from the scope of the present invention. For example, the key and the keyway may be provided between the proximal arm 14 and the shaft 54 rather than between the distal arm 20 and the shaft 54. Also, a split type collar may be affixed to the pole 12 just below the clamp 40 to afford an additional safeguard. Additionally, the positions of the plate 72 and the plate which includes grooves 73 (FIG. 3) may be reversed. That is, the plate 28 may be attached to the medical equipment 30 and the plate which includes the grooves 73 may be affixed to the distal arm 20. Thus the scope of the present invention should not be limited to the structure described in this application, but only by structures described by the language of the claims and the equivalents of those structures.

What is claimed is:

1. A mounting bracket assembly for use with a base assembly for receiving medical equipment, the base assembly including a generally vertically projecting pole, the mounting bracket assembly comprising:
a proximal arm having first and second end portions,
a distal module mount arm having first and second end portions, and first and second major surfaces,
a first module mount assembly comprising a first mounting plate attached to the first major surface of the distal module mount arm, the first mounting plate adapted to receive a first module of medical equipment,
a second module mount assembly comprising a second mounting plate attached to the second major surface of the distal module mount arm, the second mounting plate adapted to receive a second module of medical equipment,
a clamp for releasably attaching the first end portion of the proximal arm to the pole, and
pivot mounting means for mounting the first end portion of the distal module mount arm to the second end portion of the proximal arm to afford pivotal movement of the distal module mount arm relative to the proximal arm.

2. A mounting bracket assembly according to claim 1 further including securing means for releasably securing the distal module mount arm in an orientation relative to the proximal arm.

3. A mounting bracket assembly according to claim 2 wherein said securing means is adjustable to provide resistance to pivoting movement of said distal module mount arm relative to said proximal arm, and said securing means comprises means for maintaining a generally constant resistance to pivoting movement of said distal module mount arm relative to said proximal arm, such that said securing means resists change in the resistance to pivoting movement between the distal and proximal arms when said distal module mount arm is pivoted relative to said proximal arm.

4. A mounting bracket assembly according to claim 1 wherein said clamp comprises a handle having a threaded screw portion, threaded bore means for receiving the threaded screw portion, means for engaging the vertically projecting pole such that the vertically projecting pole is free of contact with the threaded screw portion to restrict damage to the pole, and wherein screwing the threaded screw portion into said threaded bore means increases the frictional engagement between the means for engaging the pole and said pole.

5. A mounting bracket assembly according to claim 1 wherein said clamp comprises a handle having a threaded screw portion, a fixed jaw having first engagement surfaces, a rib receiving groove and a threaded bore for receiving the threaded screw portion of the handle, a movable jaw having second engagement surfaces, a rib adapted to be received in the rib receiving groove of the fixed jaw, and a bore for affording passage of the threaded screw portion of the handle, wherein the movable jaw pivots in the groove of the fixed jaw relative to the fixed jaw to allow the jaws to be brought together and clamped about the pole when the threaded screw portion of the handle is screwed into the threaded bore of the fixed jaw.

6. A mounting bracket assembly for use with a base assembly for receiving medical equipment, the base assembly including a generally vertically projecting pole, the mounting bracket assembly comprising:

a proximal arm having first and second end portions, a distal module mount arm having first and second end portions, and first and second major surfaces, means for receiving a module of medical equipment on at least one of said first or second major surfaces of said distal module mount arm comprising at least one mounting plate attached to the distal module mount arm for slidably receiving the module of medical equipment and at least one O-ring operatively associated with the at least one mounting plate to restrict rattling or binding between said at least one mounting plate and the module of medical equipment, a clamp for releasably attaching the first end portion of the proximal arm to the pole, and pivot mounting means for mounting the first end portion of the distal module mount arm to the second end portion of the proximal arm to afford pivotal movement of the distal module mount arm relative to the proximal arm.

7. A mounting bracket assembly for use with a base assembly for receiving medical equipment, the base assembly including a generally vertically projecting pole, the mounting bracket assembly comprising:

a proximal arm having first and second end portions, a distal module mount arm having first and second end portions, and first and second major surfaces, means for receiving a module of medical equipment on at least one of said first or second major surfaces of said distal module mount arm comprising at least one mounting plate attached to the distal module mount arm for slidably receiving the module of medical equipment, a clamp for releasably attaching the first end portion of the proximal arm to the pole, pivot mounting means for mounting the first end portion of the distal module mount arm to the second end portion of the proximal arm to afford pivotal movement of the distal module mount arm relative to the proximal arm, and means for restricting relative movement between said module mount assembly and said medical equipment comprising a detent slit, and a detent spring for releasably engaging the detent slit.

8. A mounting bracket assembly for use with a base assembly including a generally vertically projecting pole, the mounting bracket assembly comprising:

a proximal arm having first and second end portions, a distal module mount arm having first and second end portions and upper and lower surfaces, an upper module mount assembly comprising at least one upper mounting plate attached to the upper surface of the distal module mount arm, the upper mounting plate being adapted to slidably receive a first, upper module of medical equipment, a lower module mount assembly comprising at least one lower mounting plate attached to the lower surface of the distal module mount arm, the lower mounting plate being adapted to slidably receive a first, lower module of medical equipment, a clamp for releasably attaching the first end portion of the proximal arm to the pole, pivot mounting means for mounting the first end portion of the distal module mount arm to the second end portion of the proximal arm to afford pivotal movement of the distal module mount arm relative to the proximal arm, and securing means for releasably securing the distal module mount arm in a fixed orientation relative to the proximal arm.

9. A mounting bracket assembly according to claim 8 wherein the clamp for releasably attaching the first end portion of the proximal arm to the pole comprises:

a handle having a threaded screw portion, the first end portion of the proximal arm including a fixed jaw having first engagement surfaces for engaging the vertically projecting pole, a groove on one side of the engagement surface, and a threaded bore on the other side of the engagement surface for receiving the threaded screw portion of the handle, a movable jaw having second engagement surfaces for engaging the vertically projecting pole, a rib on one side of the engagement surface adapted to be received in the groove of the proximal arm, and a bore on the other side of the engagement surface for affording passage of the threaded screw portion, and wherein after the rib is placed in the groove of the fixed jaw and the vertically projecting pole is placed between the first and second engagement surfaces, the threaded screw portion of the handle may then be manually passed through the bore in the movable jaw and threaded into the threaded bore of the fixed jaw to clamp the pole between the movable and fixed jaws, thereby to frictionally attach the first end portion of the proximal arm to the pole so that the mounting bracket assembly is free of contact between the threaded screw portion of the handle and the pole.

10. A mounting bracket assembly according to claim 8 wherein the pivot mounting means comprises:

the first end portion of the distal module mount arm having a hole, the second end portion of the proximal arm having a hole and abutment surfaces, a shaft having a top portion received in the hole of the distal module mount arm, a bottom portion received in the hole of the proximal arm, and a flange situated generally between the top and bottom portions and having bearing surfaces adapted to be supported by the abutment surfaces of the proximal arm, and means for fixedly attaching the top portion of the shaft to the distal module mount arm.

11. A mounting bracket assembly according to claim 10 wherein the means for fixedly attaching the top portion of the shaft to the distal module mount arm comprise the top portion of the shaft having a threaded bore, a threaded screw adapted to be received in the threaded bore of the top portion of the shaft, and at least one washer.

12. A mounting bracket assembly according to claim 8 wherein the second end portion of the distal module mount arm comprises surfaces extending between the upper and lower surfaces which form a hole which opens onto the upper and lower surfaces.

13. A mounting bracket assembly according to claim 8 wherein the upper mounting plate include means for restricting relative movement between the first, upper module of medical equipment and the upper mounting plate.

14. A mounting bracket assembly according to claim 8 wherein the lower mounting plate include means for restricting relative movement between the first, lower module of medical equipment and the lower mounting plate.

15. A mounting bracket assembly according to claim 8 wherein the upper mounting plate comprises a pair of mounting flanges extending generally parallel to each other, the flanges being adapted to be received in mounting channels on the first, upper module of medical equipment, and a detent slit adapted to receive a detent spring from the first, upper module of medical equipment, and a plurality of O-rings between the upper mounting plate and the top surface of the distal module mount arm.

16. A mounting system comprising:

an arm having upper and lower surfaces, and a pair of mounting plates attached to the upper and lower surfaces, at least one module of healthcare equipment having upper and lower surfaces and a pair of mounting plates attached to the upper and lower surfaces of the module of healthcare equipment, wherein the mounting plate on the upper surface of the arm is complementary with the mounting plate on the lower surface of the module of healthcare equipment, wherein the mounting plate on the bottom surface of the arm is complementary with the mounting plate on the upper surface of the module of healthcare equipment to afford flexibility in arrangement of the healthcare equipment relative to said arm, wherein the complementary mounting plates comprise:

a first mounting plate having a pair of mounting flanges extending generally parallel to each other along opposite edges of the first mounting plate, a second mounting plate having a pair of opposed mounting channels extending along opposite edges of the second mounting plate which form a track for receiving the mounting flanges of said first mounting plate, and wherein the flanges of the first mounting plate are adapted to be slidably received in the track of the second mounting plate.

17. A mounting system according to claim 16 wherein the complementary plates comprise releasable means for restricting movement between the first and second plates.

* * * * *

UNITED STATES PATENT AND TRADEMARK OFFICE
CERTIFICATE OF CORRECTION

PATENT NO. : 5,400,991
DATED : March 28, 1995
INVENTOR(S) : Jack E. Werner

It is certified that error appears in the above-indentified patent and that said Letters Patent is hereby corrected as shown below:

Col. 6, line 41, after "end" delete "pole".

Signed and Sealed this

Twenty-sixth Day of September, 1995

Attest:

BRUCE LEHMAN

*Attesting Officer*       *Commissioner of Patents and Trademarks*